United States Patent
Simon

(10) Patent No.: US 9,985,999 B1
(45) Date of Patent: May 29, 2018

(54) CHANGING AN APPLICATION BETWEEN A SINGLE-USER SESSION AND A MULTI-USER SESSION

(71) Applicant: Amazon Technologies, Inc., Seattle, WA (US)

(72) Inventor: Leonard Simon, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 283 days.

(21) Appl. No.: 14/611,638

(22) Filed: Feb. 2, 2015

(51) Int. Cl.
*G06F 15/16* (2006.01)
*H04L 29/06* (2006.01)

(52) U.S. Cl.
CPC .................. *H04L 65/403* (2013.01)

(58) Field of Classification Search
USPC ............... 709/204, 227, 222, 223, 201, 203
See application file for complete search history.

(56) References Cited

U.S. PATENT DOCUMENTS

| | | | | |
|---|---|---|---|---|
| 8,556,713 B2* | 10/2013 | Pilip | ............... | A63F 13/77 463/29 |
| 8,868,650 B1* | 10/2014 | Reeves | ............... | H04N 7/15 348/14.01 |
| 2011/0151890 A1* | 6/2011 | Platt | ............... | G06Q 10/107 455/456.1 |
| 2013/0073980 A1* | 3/2013 | Amendolagine | ..... | G06F 3/0481 715/751 |
| 2015/0254048 A1* | 9/2015 | Morton | ............... | G06F 3/1454 345/2.2 |

FOREIGN PATENT DOCUMENTS

WO   WO2011022194   2/2011

* cited by examiner

*Primary Examiner* — Lan-Dai T Truong
(74) *Attorney, Agent, or Firm* — Lee & Hayes, PLLC; Charles L. Warner

(57) ABSTRACT

Functionality is disclosed herein for changing an application between a single-user session and multi-user session. An application enters a multi-user session in response to additional users being detected and authorized. The application may enter the multi-user session in response to another user being detected as being in proximity to a first user. Data indicating that an application is to switch between the single-user session and the multi-user session may be provided by a network-based multi-user service or another application. The application may communicate and send and receive data via an API. During the multi-user session, the application uses one or more preferences associated with users of the multi-user session instead of using just the preferences of a first user. One or more displays associated with the application might also be updated to reflect the multi-user session.

20 Claims, 7 Drawing Sheets

CHANGING AN APPLICATION BETWEEN A SINGLE-USER SESSION AND A MULTI-USER SESSION

BACKGROUND

These days there are a large number of software applications that are available to users of computing devices, such as mobile computing devices. Many of these applications are designed for a single user. Some applications, however, might be used by both a single user and a group of users. For instance, a game application might be played by a single player during a single player game or played by two or more players during a multiplayer game.

Some of these applications might also allow a user to display content on another display. For example, a user might stream content from an application running on their mobile computing device to a television. The content displayed on the television might include content such as photos, movies, and the like. In some cases, a user might select photos to display such that a group of friends in the room may also view the photos on the television. In other cases, a user might share the photos with other users by sending the photos to the users (e.g., email, or text message) or uploading the photos to a network-based service. While a user might share content with a group of friends, it can be difficult for a user to determine what content to share. It might also be difficult for a user to access another user's photos.

DETAILED DESCRIPTION

Figure 1:
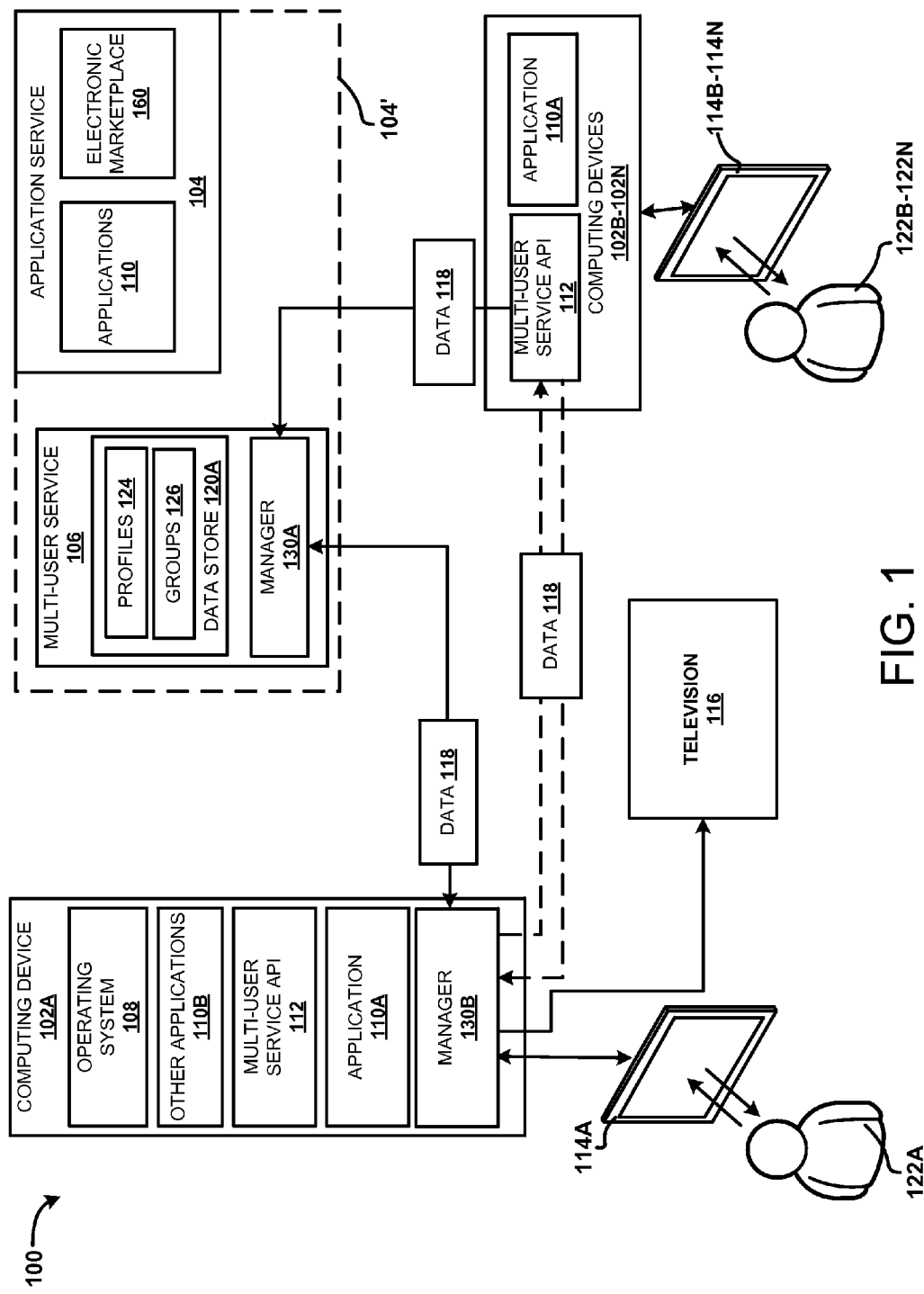
FIG. 1 is a block diagram depicting an illustrative operating environment in which an application may change between a single-user session and multi-user session using a network-based multi-user service.

The following detailed description is directed to technologies for changing an application between a single-user session and multi-user session. A "single-user session" may refer to execution of an application that takes into account preferences, information, or presence of a single user. A "multi-user session" may refer to execution of an application that takes into account preferences, information, or presence of more than one user. In some examples, an application may change from a single-user session to a multi-user session in response to detecting the presence of one or more additional users.

A user that is added to the multi-user session might be nearby (e.g., in the same room or vicinity) or might be remotely located. Through an implementation of the technologies disclosed herein, the application uses data and/or preferences obtained from the users that are part of the multi-user session when generating output. The data may be obtained from one or more sources. In some examples, all or a portion of the data might be obtained from the application providing the multi-user session. In other examples, all or a portion of the data may be obtained from social applications (e.g., FACEBOOK, TWITTER, INSTAGRAM). Users that are participating in the multi-user session may use one or more social applications that might have data that is associated to the current multi-user session. For example, in the case of a restaurant application, the restaurant application may obtain data from social applications used by the participants of the multi-user session to determine restaurants that the users previously went to or commented about.

In other examples, all or a portion of the data may be obtained from a service, such as a network-based service that maintains and/or collects the data. For example, the network-based service may determine preferences of the users of the multi-user session based on previous interactions with applications (e.g., games or productivity applications), web-browsing history, purchases made by the users, and the like. For example, the purchase or rental history for movies of one or more users of the multi-user session might be utilized by an application to provide a recommendation for a movie. Similarly, a food recommendation might be determined using purchases made at one or more restaurants.

When the application is selecting content to display during a multi-user session, the application may select the content using data and/or preferences associated with each of the users that is part of the multi-user session. In the case of a photo application, the photo application might display photos from the users of the multi-user session instead of just utilizing the preferences of the user who launched the application. In the case of an application configured to provide recommendations for a user (e.g., a movie recommendation service or a restaurant recommendation service), the application may use the preferences from the users in the multi-user session when generating recommendations instead of just using the preferences from the user who launched the application. The application might also use data that is received by users of the multi-user session when generating the recommendations. For example, during a multi-user session, a movie application might request what type of movie the users would like to see that night. The application, or some associated service, might also select advertisements and/or other promotional material to present to the users based on the users participating in the multi-user session. For instance, the application might select an advertisement that is applicable to each of the users of the multi-user session instead of just one of the users.

Different applications may change from a single-user session to the multi-user session in response to different events. For example, some applications may change to the multi-user session in response to detecting that an additional user is in the same room or vicinity. The application may return to the single-user session in response to detecting that the additional user has left the room. In other examples, applications may change to the multi-user session in response to detecting that an additional user has launched an instance of the application. In this case, the additional user that is part of the multi-user session may or may not be located nearby to the user. The application may return to the single-user session in response to detecting that the additional user has stopped using the instance of the application.

Instances of the application configured to change between the single-user session and the multi-user session may utilize an application programming interface ("API") to communicate with other computing devices during the multi-user session. The API may specify functionality for connecting the application to an application service or other computing devices as well as other tools that might be used by a software developer to develop an application for changing the application from a single-user session to a multi-user session. For example, instances of the application might utilize the API to send and receive data to one or more other computing devices and/or services. The API might also be used by an application to move a display of content to another display, or modify the display to account for the appropriate number of users.

As discussed briefly above, the application may use data received from other computing devices, and possibly other network-based services, during the multi-user session. For example, the application might receive data from a network-based multi-user service indicating when to change to the multi-user session. The application might also receive data from a network-based service (e.g., an application service, a gaming service, or a web-based retailer) that indicates the preferences of the users that are part of the multi-user session. For example, the network-based service may send data, such as profile data or preference data that may be used by the application during the multi-user session. Instead of the application just interacting with a single user during the multi-user session, the application might also receive input from the other users during the multi-user session. For instance, the API might be utilized by another instance of the application to send data to the application providing the multi-user session that includes data input by a user participating in the multi-user session.

In some configurations, an instance of the application may directly communicate with other instances of the application during the multi-user session. For example, the application might send data that is used by another instance of the application executing on another computing device to display data associated with the multi-user session. In other examples, the instances of the application might communicate via a network-based service. For example, the instances of the application might use the network-based service to broker the exchange of data between the different instances. In yet other examples, the instance of the application may not communicate with other instances of the application. For example, the application might generate a view on a display that is viewable by other users that are part of the multi-user session.

In some examples, the network-based service might provide data maintained by the network-based service to the application during the multi-user session. For example, the network-based service might determine preferences of one or more of the user that are part of the multi-user session based on previous uses of the application or a similar application. Additional details regarding the various components and processes described above for changing an application between a single-user session and a multi-user session will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples. The drawings herein are not drawn to scale. Like numerals represent like elements throughout the several figures (which may be referred to herein as a "FIG." or "FIGS.").

Referring now to FIG. 1, an operating environment 100 is illustrated in which an application may change between a single-user session and multi-user session using a network-based multi-user service according to various examples presented herein. As illustrated, the operating environment 100 shown in FIG. 1 includes computing devices 102A-102N, an application service 104, and a multi-user service 106. While specific functionality is described with respect to particular components, it should be appreciated that some or all of the functionality of one or more components may be implemented in different configurations. For example, some of the functionality provided by the application service 104 and/or the multi-user service may be combined and/or distributed between different components. The operating environment 100 illustrated in FIG. 1 is one possible configuration, and other configurations may be utilized.

According to some examples, the computing devices 102A-102N, which may be referred to as "computing devices 102", may each be configured as a tablet computing device, a personal computer ("PC"), a desktop computer, a laptop computer, a notebook computer, a cellular phone or smartphone, other mobile computing devices, a personal digital assistant ("PDA"), a video game system, a set-top box, a smart television, or the like. According to other examples, at least a portion of the functionality of the computing devices 102 may be provided by the application service 104 or a service provider network (See the service provider network 520 illustrated in FIG. 5). The application service 104, the multi-user service 106 or the service provider network 520 may include one or more application servers, Web servers, data storage systems, network appliances, dedicated hardware devices, and/or other server computers or computing devices. In these examples, the computing devices 102 can include minimal hardware for connection to a network-based computing platform via a network (not shown).

The computing devices 102 may communicate via the network to access various services or computing resources described herein. For example, the computing devices 102 can access the application service 104 and/or the multi-user service 106. In some examples, the application service 104 may include the multi-user service 106 as indicated by dashed line 104'. The functionality of the application service 104 and/or the multi-user service 106 may be provided by one or more application servers, Web servers, data storage systems, network appliances, dedicated hardware devices, and/or other server computers or computing devices. For example, the functionality of the multi-user service 106 might be provided by the computing device 102A that also includes the application 110A. In other examples, the multi-user service 106 may be provided by one or more other computing devices (e.g., servers) that are separate from the user computing device 102A. In other examples, the functionality of the multi-user service 106 may be provided by some other combination of computing devices. More details regarding the operation of the application service 104 and/or the multi-user service 106 are provided below.

The computing device 102A may be configured to execute an operating system 108 and one or more applications such as, an application 110A, a multi-user service API 112, other applications 110B, as well as other application programs or components. The application 110A might be any application that is configured to change between a single-user session and a multi-user session. The other applications 110B might include one or more Web browser applications, one or more productivity applications (e.g., word processing, spreadsheet, and/or presentation applications), one or more design applications, or any other applications.

In some examples, the application 110A is configured to utilize the multi-user service API 112. Although the computing devices 102B-102N are not shown in the same detail as the computing device 102A, it should be understood that the computing devices 102B-102N may be identically configured or may have more or fewer application programs and/or components than are illustrated for the computing device 102A.

The application service 104 may be configured to provide support for the applications 110. For example, the application service 104 may provide data to the multi-user service 106. In some examples, the applications 110 may be operative to provide features such as, but not limited to, gaming features, media playback features (e.g., movies, photos), messaging features, recommendation features, marketplace features, and the like.

The applications 110 may be configured to display visual content on one more displays 114. The visual content can include, but is not limited to, two-dimensional content, three-dimensional content, or a combination thereof. The applications 110 might also provide audial content such as, but not limited to, music, speech, and sound effects. The application 110 might also provide haptic feedback, such as vibration feedback.

Input to the application 110A can be provided via one or more input devices (not shown) that are connected to or otherwise are in communication with the computing device 102A. Input to the application 110A can be used to control aspects of the application 110A, such as, for example, controlling characters, navigating menus, entering data, and the like. The computing device 102A may also be configured to present the visual content provided by the application 110A on one or more display devices that are built-in to or are external to and in communication with the computing device 102A, such as a display 114A and or television 116.

The display 114A is an output device configured to present information in a visual form. In particular, the display 114A may present visual content provided by the application 110A, graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some examples, the display 114A is a liquid crystal display ("LCD") utilizing any active or passive matrix technology and any backlighting technology (if used). In other examples, the display 114A may be an organic light emitting diode ("OLED") display. Other display types are contemplated. In addition, the display 114A can include an input device such as a touchscreen or multi-touch enabled touchscreen.

All or a portion of the applications 110 may utilize the API 112 to interact with the application service 104, the multi-user service 106 and/or other applications 110. The applications 110 may be configured to call one or more methods exposed by the API 112 to access the application service 104, the multi-user service 106 via a network (not shown) to take advantage of one or more of the features provided by the respective service. For example, the multi-user service API 112 may be used by the application 110A to send and receive data 118A to/from the multi-user service 106. The applications 110 can also be configured to call one or more methods exposed by the API 112 to access another computing device and/or another instance of the application 110 via the network. In some examples, the application 110A may send and receive the data 118 to/from the computing devices 102B-102N.

As illustrated, the multi-user service 106 includes the manager 130A that manages one or more multi-user sessions during which a computing device, such as the computing device 102A, executes the application 110A. The multi-user service 106 may support connections to any number of computing devices 102 so that one or more users utilizing the various computing devices 102 can share data with the application service 104, the multi-user service 106, and possibly with one another. As such, the illustrated example is merely illustrative, and should not be construed as being limiting in any way.

As discussed, an application, such as the application 110A, may be configured to send data 118 to the manager 130A. The received data 118 might be stored locally in a data store 120A. Data 118 that are sent to the manager 130A and/or the manager 130B may be defined by the software developers of the application 110A, by the application service 104, the multi-user service 106, or by some other entity. Similarly, the actions that might be performed by an application 110A while providing a single-user session or a multi-user session may be defined by the software developers of the application 110A, by the application service 104, the multi-user service 106, or by some other entity.

In some examples, the application service 104 provides an electronic marketplace 160 through which users can purchase content, such as, for example, applications, the applications 110, application add-ons, in-application items, music, e-books, movies, and the like. It should be understood that various implementations of the operating environment 100 include multiple networks, application services 104, multi-user services 106, applications 110 and multi-user service APIs 112. As such, the illustrated example should be understood as being illustrative, and should not be construed as being limiting in any way.

As discussed above, an application, such as the application 110A, may change between a single-user session and multi-user session. For example, the user 122A may initially launch the application 110A to provide a single-user session. During the single-user session, the application 110A might display graphical content on the display 114A and/or on the television 116. At some point during the execution of the application 110A, another user that may be interested in participating in a multi-user session provided by the application 110A might be detected.

In some configurations, the application 110A may receive data from another instance of the application 110A that is executing on another computing device, such as computing devices 102B-102N indicating a request or an instruction to add the user to a multi-user session. For instance, an instance of the application 110A executing on the computing device 102A might receive data 118 via the multi-user service API 112 indicating that a user would like to join a multi-user session. In other examples, the instance of the application 110A executing on the computing device 102A might receive data 118 via the manager 130A operating in the multi-user service 106 indicating to change to application to a multi-user session. In some configurations, the application 110A may be launched and determine whether to start execution in a single-user session or a multi-user session. For example, when no other users are detected, the application 110A may start as a single-user session. When other users are detected (e.g., by the multi-user service 106), the application 110A may start in a multi-user session.

The additional users, such as one or more of users 122B-122N might be nearby (e.g., in a same room or vicinity) or the additional users might be remotely located. When the users are in a same room, or otherwise within a viewing area of the television 116, the graphical content might be displayed on the television 116. The graphical content might also be displayed on one or more of the displays 114A-114N. For example, when the user in a multi-user session is located remotely, the display 114 of the remotely located user might display the graphical content generated by the application 110A while in the multi-user session. When a user enters or leaves the same room or vicinity, the display(s) uses to display the graphical content may change and/or the graphical content that is displayed may be modified.

In some examples, the application 110A uses information (e.g., preferences) specified in one or more of the profiles 124 and/or data obtained from one or more users during the multi-user session. For example, in response to a user joining the multi-user session, the profile of the user might be obtained from the profiles 124 and provide to the manager 130B for use by the application 110A. The profile might include a variety of information relating to the user. Some of the information that might be included in a profile might include, but is not limited to preferences of the user for the application 110A, data associated with the user of the application 110A by the user and the like. For example, when the application 110A is a restaurant recommendation application, the profile information for the user that is used by the application 110A during the multi-user session might include previous restaurants chosen by the user, types of food preferred or disliked by the user, and the like.

As briefly discussed above, all or a portion of the data used during the multi-user session might come from a social application (e.g., TWITTER, FACEBOOK, INSTAGRAM, and the like) and/or a network-based service. For example, when the application is a game application, the data used by the game application might include data obtained from a game service, such as GAMECIRCLE, that includes data such as leaderboards, achievement, and other game play data from games that one or more users of the multi-user session play.

When the application 110A is a movie application, the data might include movie preferences of the user joining the multi-user session. For example, a streaming service (e.g., NETLIX, AMAZON, HULU) might provide movie preferences for the users participating in the movie session. Similarly, a network-based service (e.g., an e-retailer) associated with the multi-user service 106 might provide data indicating movie preferences based on previous purchases or browsing history of the users, or similarly situated users.

As briefly discussed above, the application 110 and/or the multi-user service 106, might select advertisements and/or other promotional material to display to the users on one or more displays 114 based on the preferences or other data associated with the users participating in the multi-user session. For instance, the application 110 and/or the multi-user service 106 might select an advertisement for an application that is available for purchase or rent from the application service 104 (or some other marketplace) based on the preferences of each of the users participating in the multi-user session. Similarly, the application 110 and/or the multi-user service 106 might select an advertisement for some other good or service using the preferences of the participants of the multi-user session. The application 110 and/or the multi-user service 106 might also select a coupon to provide using the preferences of the participants of the multi-user session.

In some configurations, the multi-user service 106 might generate additional data 118 that is provided to the manager 130B for use by the application 110A. For instance, the multi-user service 106 might access usage information associated with the user that indicates how often a user utilizes the application 110A, or other similar applications. The multi-user service 106 might also provide the manager 130B with temporary access (when authorized) to files (e.g., photos, movies, songs) of the user during the multi-user session. For example, when the application 110A is a music application, the multi-user service 106 might provide one or more playlists along with access to the songs of the user during the multi-user session.

During the multi-user session, the application 110 uses the data 118 associated with the users of the multi-user session during execution. For example, in the music-playing example, the application 110A may utilize the musical preferences of the user who launched the application 110A in addition to the other users participating in the multi-user session. As discussed above, different types of applications might use the user data differently during a multi-user session. The following examples are provided for illustrative purposes and are not intended to be limiting.

During a multi-user session, a trivia application 110 may tailor questions to the group's common interests. The interests might be determined by the manager 130A, the manager 130B, and/or the application 110A using the information contained in the profiles 124. A poker application 110 that is initially displayed on the television 116 during the single-user session may move a player's "hand" to their mobile computing device 102 when others enter the room and join a multi-user session. A social media application 110 may pivot from focusing on an individual's social network to a group's network depending on who is participating in the multi-user session. In other examples, an application 110 may display data obtained from different social networks and/or social applications into a single display. In other configurations, the application 110 might display data from different sources within different areas of a display. A recommendation application 110 (e.g., a movie application or a photo application) may offer suggestions based on the likes and dislikes of the particular individuals in the multi-user session. An application 110 that is configured to receive selections for delivery (e.g., a to-go restaurant application) may select items for delivery based on the individuals that are currently part of the multi-user session. A recommendation application 110 may receive input from users in the multi-user session and provide recommendations based on the input and past history or preferences of the users to generate recommendations.

Different applications 110 may change from a single-user session to the multi-user session in response to different events. For example, some applications may change to the multi-user session in response to detecting that an additional user is in the same room or vicinity. The location of a user might be determined from coordinates of a computing device (e.g., global positioning coordinates), whether the computing device has connected to a same network, whether the device is proximate to another device (e.g., Infra-red, photoelectric, acoustic, capacitive, or radio-frequency proximity sensors), whether a BLUETOOTH enabled device is nearby or connected, and the like.

In some configurations, a user is not authorized to join a multi-user session unless authorized. For example, the multi-user service 106 might store a list of users that are authorized to join a multi-user session for one or more applications, such as the application 110A. In other examples, the user 122A might authorize users who desire to a particular multi-user session. In other examples, some applications may change to the multi-user session in response to detecting that an additional user has launched an instance of the application 110. In this case, the additional user that is part of the multi-user session may or may not be located nearby to the user. The application 110 may return to the single-user session in response to detecting that the additional user has stopped using the instance of the application 110.

Generally, the application 110A may return to the single-user session in response to detecting that no users, other than the user 122A, remain in the multi-user session. In some examples, a user might be removed from the multi-user session in response to the user leaving the room that the user 122A is in. In other examples, a user might select an option within an instance of the application 110A executing on a computing device 102 that they are utilizing to leave the multi-user session.

As discussed above, the application 110A may utilize the multi-user service API 112 to communicate with other computing devices during the multi-user session. The API 112 may specify functionality for connecting the application 110A to the application service 104, the multi-user service 106, or other computing devices as well as other tools that might be used by a software developer to develop the application 110A for changing between a single-user session and a multi-user session. The API 112 might also specify functionality for sending and receiving user data, such as user data stored in the profiles 124. The API 112 might also specify functionality for specifying users that are authorized to join a multi-user session, where the users should be located (e.g., relative to the user 122A) when joining the multi-user session, and the like. Generally, instances of the application 110A might utilize the API 112 to send and receive data 118 to one or more other computing devices and/or services. The API 112 might also expose one or more methods that might be used by the application 110A to display content on one or more of the displays 114A-114N and/or the television 116. The API 112 may also be used to change between a single-user session and a multi-user session. According to some configurations, the API 112 exposes one or more methods to determine what type of computing device the users are currently using (e.g., desktop, set-top box, or smart phone), where the users are located (e.g., within a same vicinity, or at a specified destination), request data from one or more users, and the like. For example, the application 110A may utilize the API 112 to determine when all of the users are at a same location. The APIs allow developers to integrate multi-user session functionality into applications and computer programs.

As also discussed above, during the multi-user session, the application 110A may use data 118 received from other computing devices 102, and possibly network-based services (e.g., the application service 104 and/or the multi-user service 106), during the multi-user session. In some examples, the application 110A receives data from the network-based multi-user service 106 indicating when to change the application to the multi-user session. The application 110A might also request and/or receive data 118 from the other users during the multi-user session. For instance, the API 112 might be utilized by another instance of the application 110A executing on another computing device 102 to send data 118 (e.g., input to the application 110A) to the application 110A providing the multi-user session.

The application 110A may also be configured to request data from users participating in a multi-user session. For example, during a multi-user session, a restaurant application may request what type of food or restaurant the users prefer. A music application might request song preferences, or other music preferences from a user. In response to receiving the request for data, one or more of the users participating in the multi-user session may provide the requested data to the application 110A and/or the multi-user service 106. The application 110A and/or the multi-user service 106 may then use this data to generate data that is output to one or more displays 114 and/or television 116.

Figure 2:
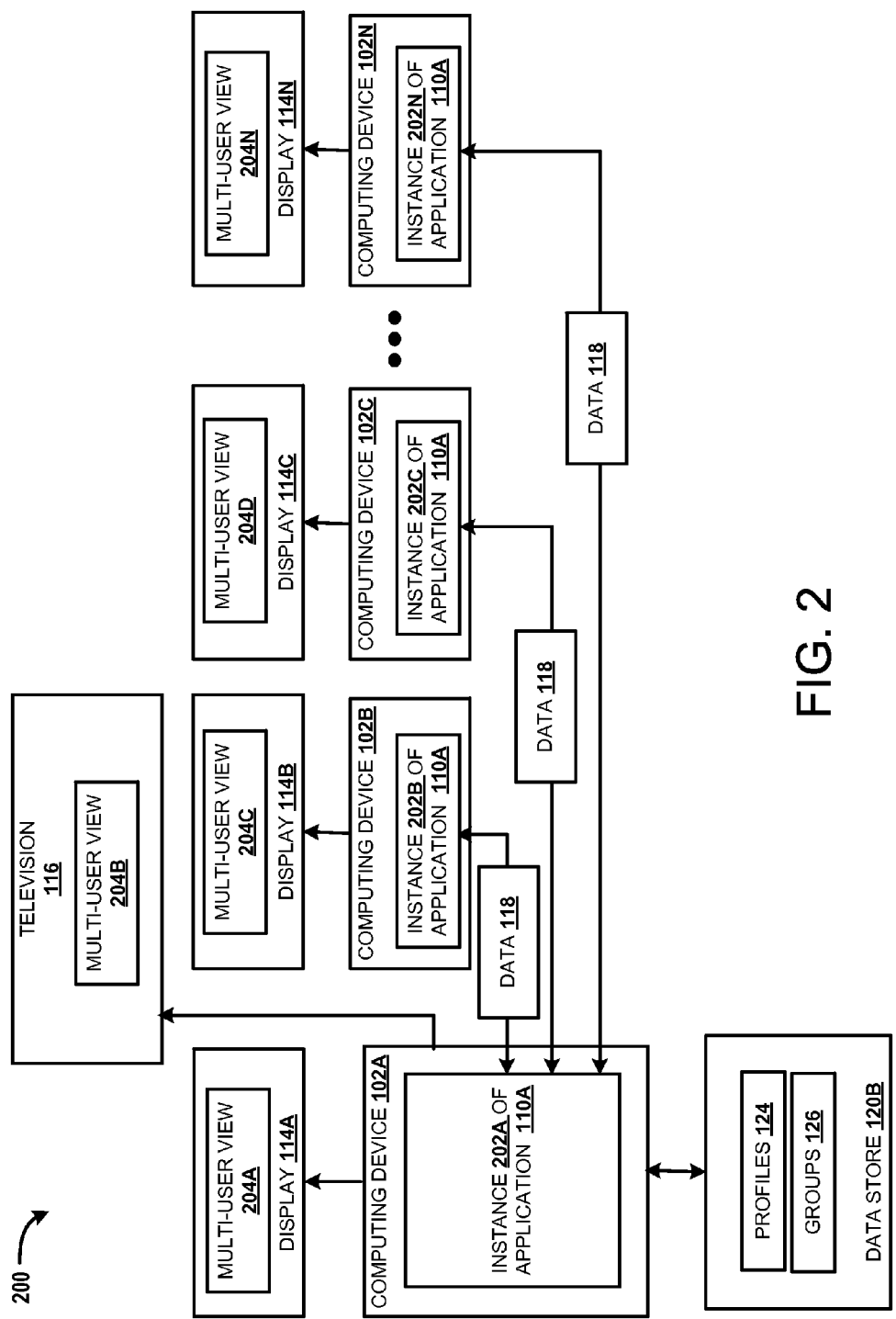
FIG. 2 is a system diagram that illustrates an application changing between a single-user session and a multi-user session.

FIG. 2 is a system diagram 200 that illustrates an application 110A changing between a single-user session and a multi-user session. System diagram 200 includes the computing devices 102A-102N, displays 114A-114N, television 116 and the data store 120B. Each of the computing devices 102A-102N may be configured to execute instances 202A-202N of the application 110A. As discussed above, the instances 202A-202N of the application 110A may communicate directly with one another and/or they may communicate using the multi-user service 106.

In the example illustrated in FIG. 2, the instances 202A-202N of the application 110A are configured to communicate directly with one another without the use of the multi-user service 106 illustrated in FIG. 1. For example, the instances 202A-202N may communicate using functionality specified by the API 112. As discussed above, an instance of an application, such as the instance 202A of the application 110A, begins execution in a single-user session and later changes to a multi-user session in response to a user joining the session.

In some configurations, the instance 202A receives data 118 from one or more other instances 202 of the application 110A. The data 118 might include a request to join a multi-user session, an indication that the computing device 102 is within a designated location (e.g., the same room) to join the multi-user session, and the like. In some examples, when an instance 202 of the application 110 is executed and the computing device 102 is within a specified area relative to the computing device 102A, the instance sends data 118 to the instance 202A of the application 110A requesting to join a multi-user session. In some examples, the instance 202A might request another instance (e.g., one or more of the instances 202B-202N) to join a multi-user session.

According to some examples, in response to receiving the request, the instance 202A might access the groups 126 data stored in the data store 120B to determine if the user that is associated with the request is authorized to join a multi-user session provided by the application 110A. In other examples, the user of the computing device 102A might authorize the user by selecting a user interface option. In yet other examples, the user might automatically be permitted to join a multi-user session.

In response to the request to join a multi-user session, the instance 202A of the application 110A may enter (or start) the multi-user session. As discussed above, during the multi-user session, instead of the instance 202A just using the preferences of the user of the computing device 102A, the instance 202A uses the preferences of the other users that are part of the multi-user session along with the preferences of the user who launched the application 110A. The instance 202A might obtain this user information from the profiles 124 stored by the data store 102B, or from some other location. In some examples, the instance 202A generates one or more multi-user views 204, such as the multi-user views 204A-204N. In some configurations, the instance 202A may request data from one or more of the users that are participating in the multi-user session. In other configurations, the other instances 202B-202N might provide the instance 202A with data to be used during the multi-user session. For example, one or more of the users associated with the instances 202B-202N might provide data that is used by the instance 202A to generate output that is displayed on one or more displays 114A-114N. According to some configurations, a same multi-user view may be displayed on each of the displays 114A-114N and the television 116. In other configurations, different multi-user views 204 might be displayed on the different displays 114. For example, graphical content that is more relative to a particular user might be highlighted or displayed differently on the display 114 that is associated with the user. In other examples, the instances 202A-202N may communicate directly with each other using a peer-to-peer configuration.

Figure 3:
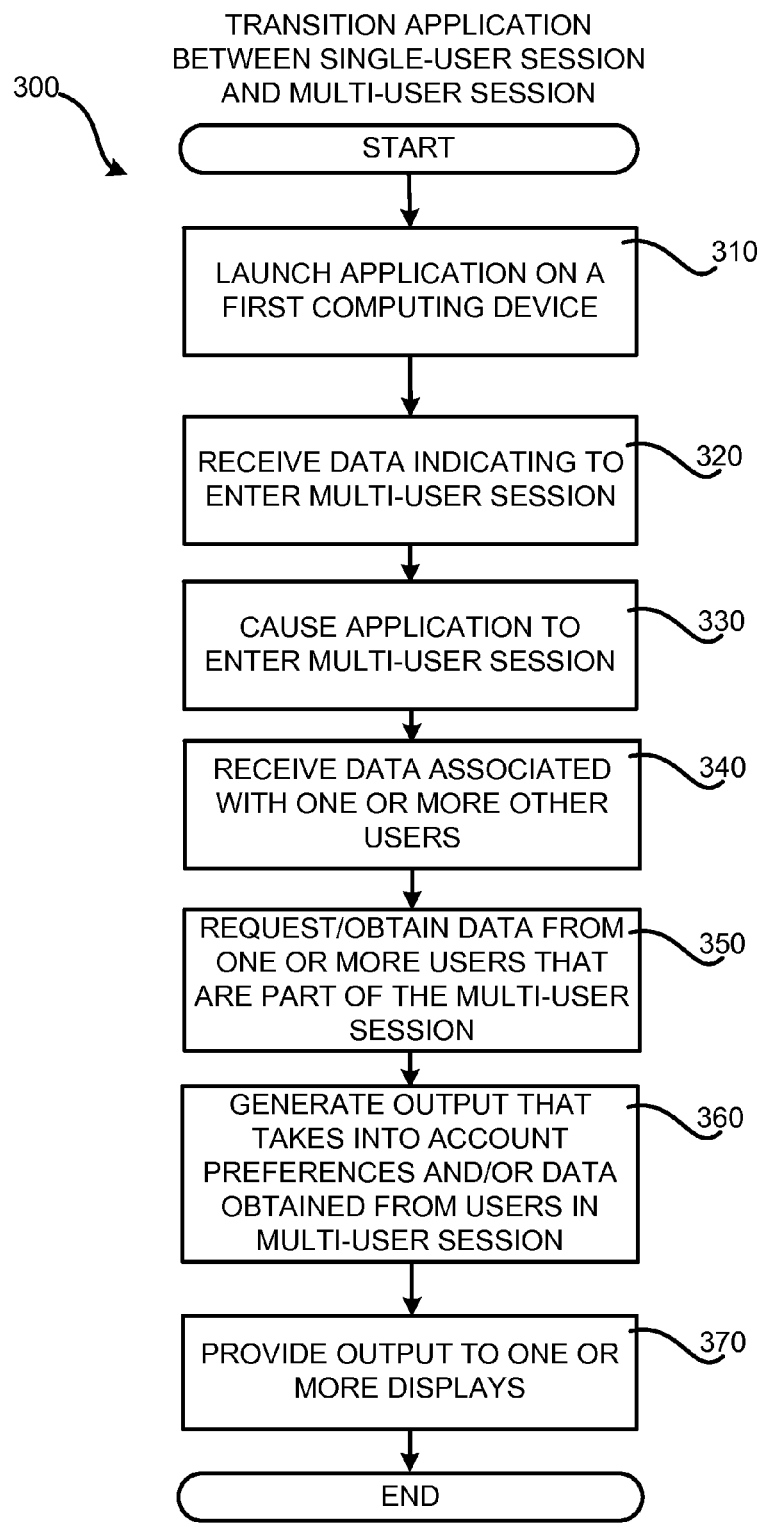
FIG. 3 is a flow diagram showing a routine illustrating aspects of a mechanism disclosed herein for changing an application between a single-user session and a multi-user session.
Figure 4:
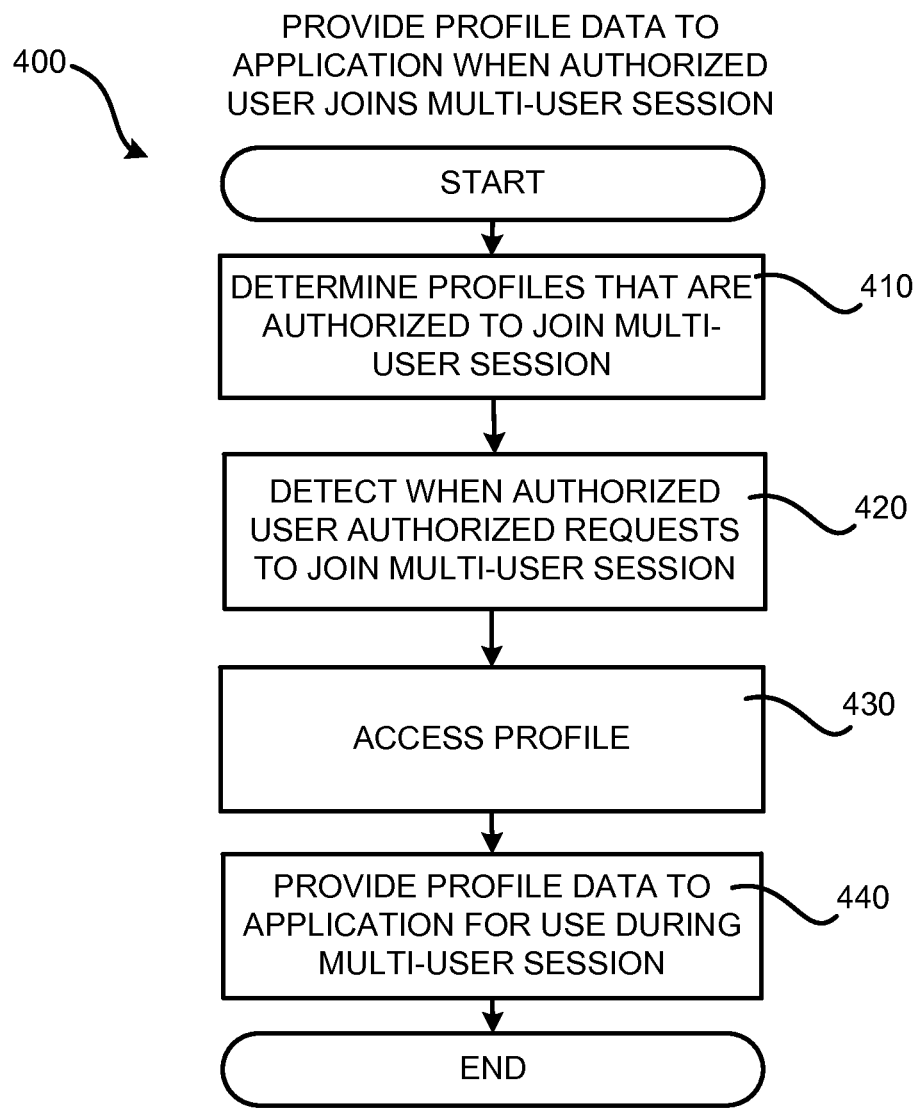
FIG. 4 is a flow diagram showing a routine illustrating aspects of a mechanism disclosed herein for sending user data to an application to be used during a multi-user session.

FIGS. 3-4 are flow diagrams showing routines that illustrate aspects of changing application behavior between a single-user session and a multi-user session, according to an example disclosed herein. It should be appreciated that the logical operations described herein with respect to FIGS. 3-4, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 is a flow diagram showing a routine 300 illustrating aspects of a mechanism disclosed herein for changing an application between a single-user session and a multi-user session. The routine 300 may begin at operation 310, where an application 110A is launched on a computing device. As discussed above, the application 110A may be executed on the computing device 102A, or some other computing device. In some examples, the application 110A utilizes the multi-user service API 112 to communicate with the multi-user service 106 and/or other computing devices. In some examples, the application 110A is initially launched for a single user as a single-user session. In other examples, the application 110A may initially be launched without entering a single-user session or multi-user session.

From operation 310, the routine 300 may proceed to operation 320, where data 118 is received that indicates to enter a multi-user session. As discussed above, the data 118 may be received from another computing device, such as a computing device associated with the multi-user service 106 and/or another computing device that is executing an instance of the application 110A. In some examples, the data 118 is received in response to a user entering a same room as the user utilizing the application 110A. In other examples, the data 118 is received in response to a user launching an instance of the application 110A on another computing device. In yet other examples, the data 118 is received in response to a request by a user desiring to join the multi-user session. According to some configurations, the application 110A may receive data upon launch that indicates whether to enter a single-user session or a multi-user session. For example, upon launch, the application 110 may query the multi-user service 106 to determine whether there are one or more other users to participate in a multi-user session. In some examples, the application 110A queries the multi-user service 106 that is located on the same computing device 102A. In other examples, the application 110A queries the multi-user service that is located on other computing devices.

From operation 320, the routine 300 may proceed to operation 330, where the application enters the multi-user session. As discussed above, when the application is in the multi-user session, the application 110A may use preferences and/or data received from the users associated with the users that are part of the multi-user session when generating output (e.g., recommendations, selections, or graphical content). For example, the application 110A may generate a multi-user view that includes data from the users in the multi-user session when in the multi-user session.

From operation 330, the routine 300 may proceed to operation 340, where data associated with one or more other users in the multi-user session may be received. As discussed above, the application 110A may receive profile information from the multi-user service 106 and/or information about the user (e.g., user preferences) using some other mechanism. In some examples, the application 110A receives data (e.g., past usage data) generated and maintained by the application service 104 and/or the multi-user service 106.

From operation 340, the routine 300 may proceed to operation 350, where data may be requested or obtained from one or more of the users that are part of the multi-user session. As discussed above, the application 110A may utilize the multi-service API 112 to request data from users that are participating in the multi-user session. In other examples, a user that is part of the multi-user session might provide data to the multi-user session without first being requested to provide data. For example, a user might enter data using a graphical user interface, or some other type of interface (e.g., speech), that is provided to the multi-user service 106 and/or directly to the application 110A.

From operation 350, the routine 300 may proceed to operation 360, where output is generated by the application 110A that takes into account preferences of the users that are participating in the multi-user session. As discussed above, instead of the application 110A just using the preferences of the user that used the application in the single-user mode, the application 110A may use the preferences of all or a portion of the users in the multi-user session. The application 110A might also use data that is obtained from the users participating in the multi-user session, or other data obtained from various services, or applications. For example, as discussed above, the data might include data relating to previous interactions with applications, game play history, web-browsing history, purchases made by the users, and the like.

From operation 360, the routine 300 may proceed to operation 370, where the output is display is provided. As discussed above, the application 110A might stream content to another display (e.g., a television) and/or might update one or more of the displays that are associated with the users that are part of the multi-user session. Routine 300 may then proceed to an end operation. Alternately, the routine 300 might proceed back to repeat some or all of the processing operations described above. For example, from operation 370, the routine 300 may proceed back to operation 320.

FIG. 4 is a flow diagram showing a routine 400 illustrating aspects of a mechanism disclosed herein for sending profile data to an application to be used during a multi-user session. The routine 400 may begin at operation 410, where profiles that are authorized to join a multi-user session are determined. As discussed above, an authorized user may specify other users that are authorized to join a multi-user session provided by an application 110. In some examples, each application 110 may include settings that specify the users that are authorized to join a multi-user session. In other examples, a user may specify the other users that may join the multi-user group.

From operation 410, the routine 400 may proceed to operation 420, where an authorized user that desires to join the multi-user session is detected. As discussed above, the user may be detected when the user enters a same room or vicinity as another user in the multi-user group and/or when the user launches an instance of an application. In other examples, the user might be detected using other mechanisms. For example, a user might be visually detected and invited to join the multi-user session using an invite message.

From operation 420, the routine 400 may proceed to operation 430, where the profile associated with the user is accessed. As discussed above, the multi-user service 106, or some other service or computing device, might store profiles 124 for one or more users. The profiles 124 may include user preferences for one or more applications 110. The profiles 124 might also include other data (e.g., usage data, previous purchases) that might be used by the application 110 during a multi-user session. For example, as discussed above, a service or application might collect data about the use of applications (e.g., games or other applications) that may be provided by the multi-user service 106 to the application 110. The multi-user service 106 might also obtain data from a network-based service, or some other source, that indicates preferences of one or more users participating in the multi-user session using previous purchases made by the users, or similarly situated users. For example, the purchase data might be utilized by a recommendation application to recommend an item based on purchases that are common between at least a portion of the users.

From operation 430, the routine 400 may proceed to operation 440, where the profile data for the user is provided to the application. As discussed above, the multi-user service 106 might send the profile data to the application 110, and/or the application 110 might utilize the API 112 to access the profile data of the user joining the multi-user session. The routine 400 may then proceed to an end operation. Alternately, the routine 400 might proceed back to repeat some or all of the processing operations described above. For example, from operation 440, the routine 400 may proceed back to operation 420.

Figure 5:
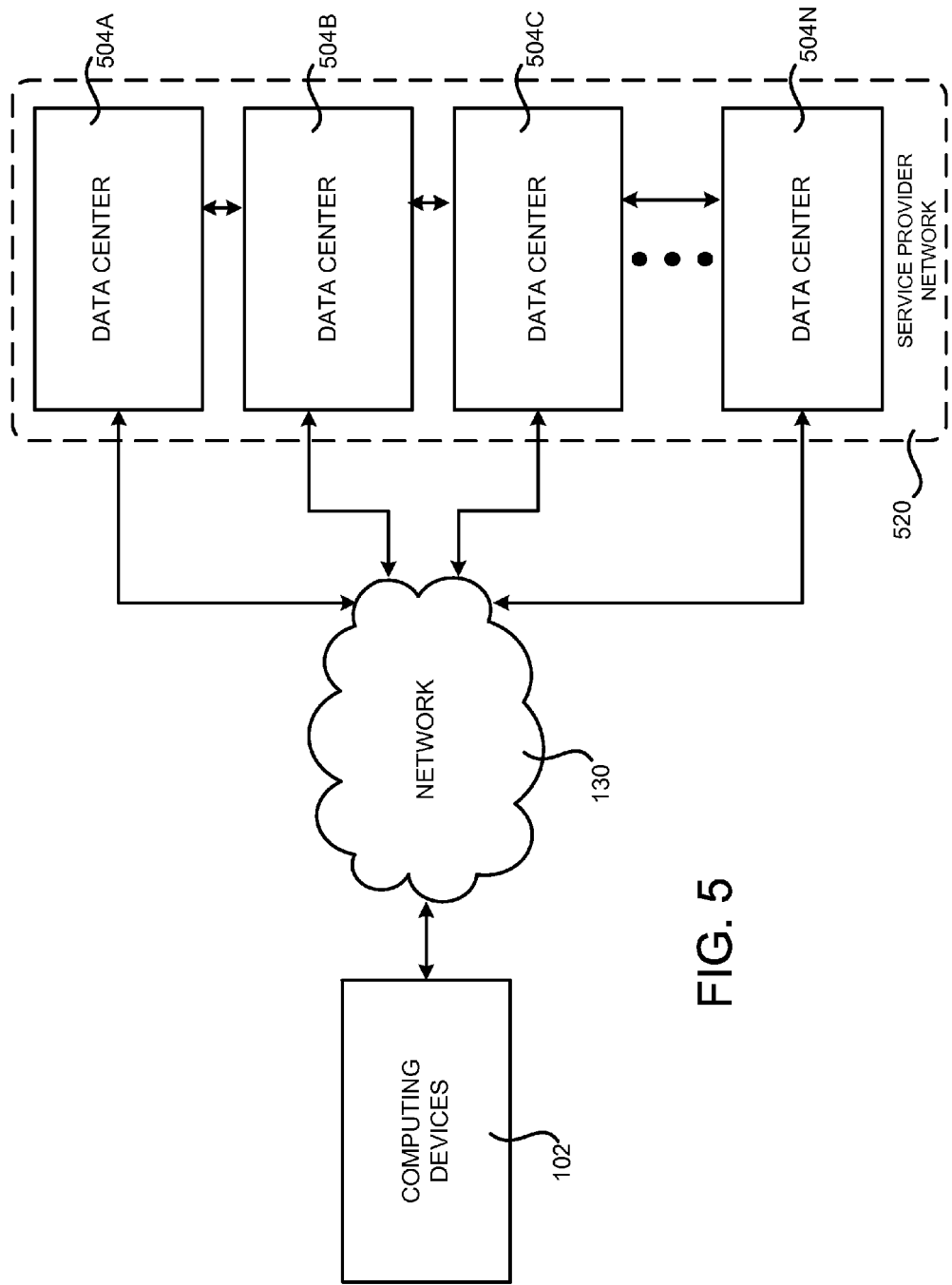
FIG. 5 is a system and network diagram that shows one illustrative operating environment for the examples disclosed herein that includes a service provider network.

FIG. 5 and the following description are intended to provide a brief, general description of a suitable computing environment in which the examples described herein may be implemented. In particular, FIG. 5 is a system and network diagram that shows an illustrative operating environment that includes a service provider network 520. As discussed above, service provider network 520 can provide virtual machine instances and computing resources on a permanent or an as-needed basis.

The computing resources provided by the service provider network 520 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 520 are enabled in one implementation by one or more data centers 504A-504N (which may be referred to herein singularly as "a data center 504" or collectively as "the data centers 504"). The data centers 504 are facilities utilized to house and operate computer systems and associated components. The data centers 504 typically include redundant and backup power, communications, cooling and security systems. The data centers 504 might also be located in geographically disparate locations. One illustrative configuration for a data center 504 that implements some or all of the concepts and technologies disclosed herein will be described below with regard to FIG. 6.

The users and customers of service provider network 520 may access the computing resources provided by the data centers 504 over a suitable data communications network, such as a Wide Area Network ("WAN"), as illustrated by network 130. Although a WAN might be used, it should be appreciated that a local-area network ("LAN"), the Internet, or any other networking topology known in the art that connects the data centers 504 to the computing devices 102 may be utilized. It should also be appreciated that combinations of such networks might also be utilized.

Figure 6:
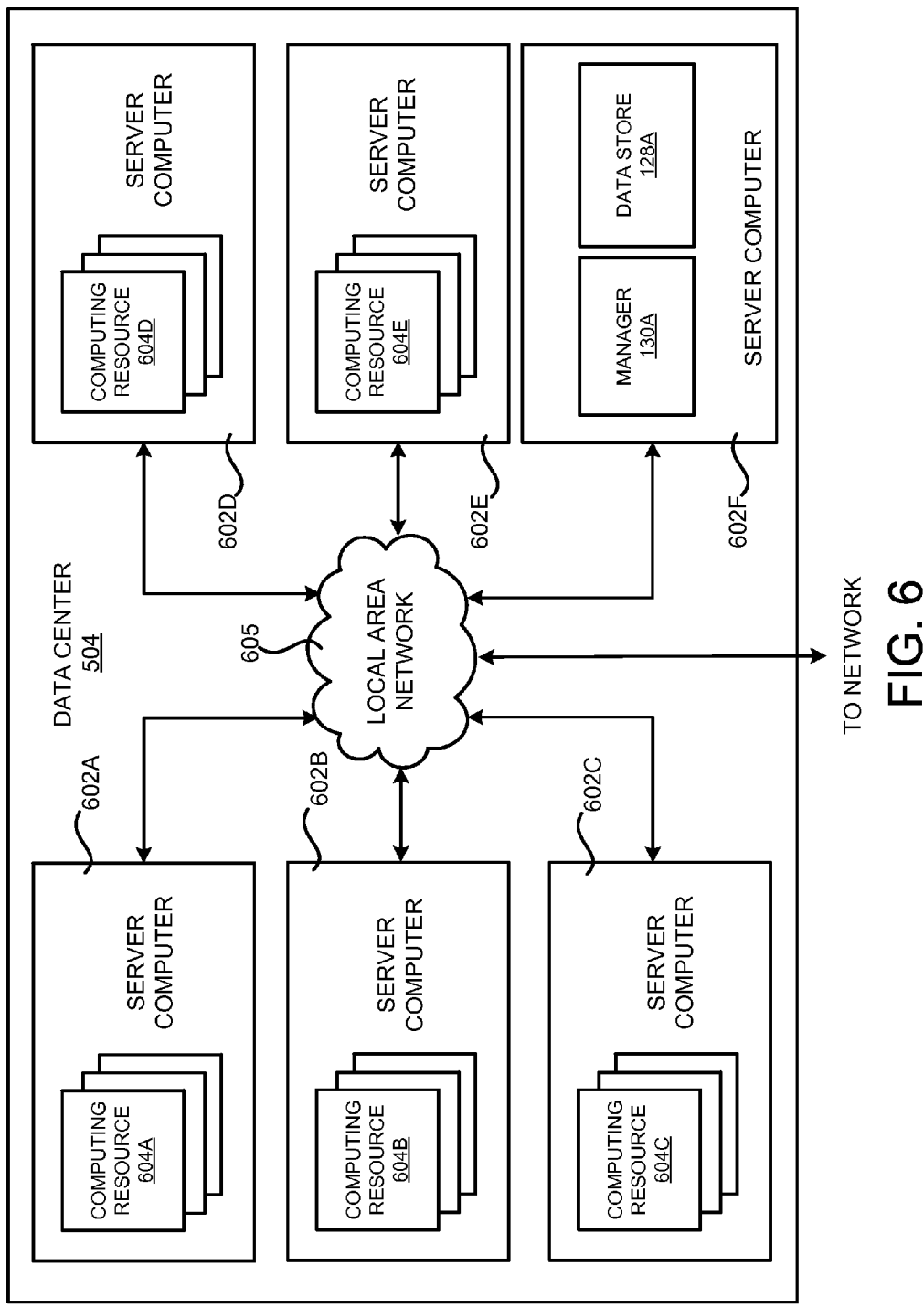
FIG. 6 is a computing system diagram that illustrates one configuration for a data center that implements aspects of a service provider network, including some or all of the concepts and technologies disclosed herein in which an application may change to a multi-user session.

FIG. 6 is a computing system diagram that illustrates one configuration for a data center 504 that implements aspects of a service provider network 520, including some or all of the concepts and technologies disclosed herein in which an application may change to a multi-user session. The example data center 504 shown in FIG. 6 includes several server computers 602A-602F (which may be referred to herein singularly as "a server computer 602" or in the plural as "the server computers 602") for providing computing resources. The server computers 602 may be standard tower or rackmount server computers configured appropriately for providing the computing resources described herein. According to an example, the server computers 602 are configured to execute the software products as described above.

In one example, some of the computing resources 604 are virtual machine instances. As known in the art, a virtual machine instance is an instance of a software implementation of a machine (i.e. a computer) that executes programs like a physical machine. Each of the server computers 602 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 602, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 504 shown in FIG. 6 also includes a server computer 602F reserved for executing software components for managing the operation of the data center 504, the server computers 602, virtual machine instances, and other resources within the service provider network 520. The server computer 602F might also execute the manager 130A and include the event data store 128A. Details regarding the operation of each of these components has been provided above. In this regard, it should be appreciated that while these components are illustrated as executing within service provider network 520, computing systems that are external to service provider network 520 might also be utilized to execute some or all of these components. Other configurations might also be utilized.

In the example data center 504 shown in FIG. 6, an appropriate local area network ("LAN") 605 is utilized to interconnect the server computers 602A-602E and the server computer 602F. The LAN 605 is also connected to the network 130 illustrated in FIG. 5. It should be appreciated that the configuration and network topology illustrated in FIGS. 5 and 6 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 602A-602F in each data center 504 and between virtual machine instances and other types of computing resources provided by the service provider network 520.

It should be appreciated that the data center 504 described in FIG. 6 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 7:
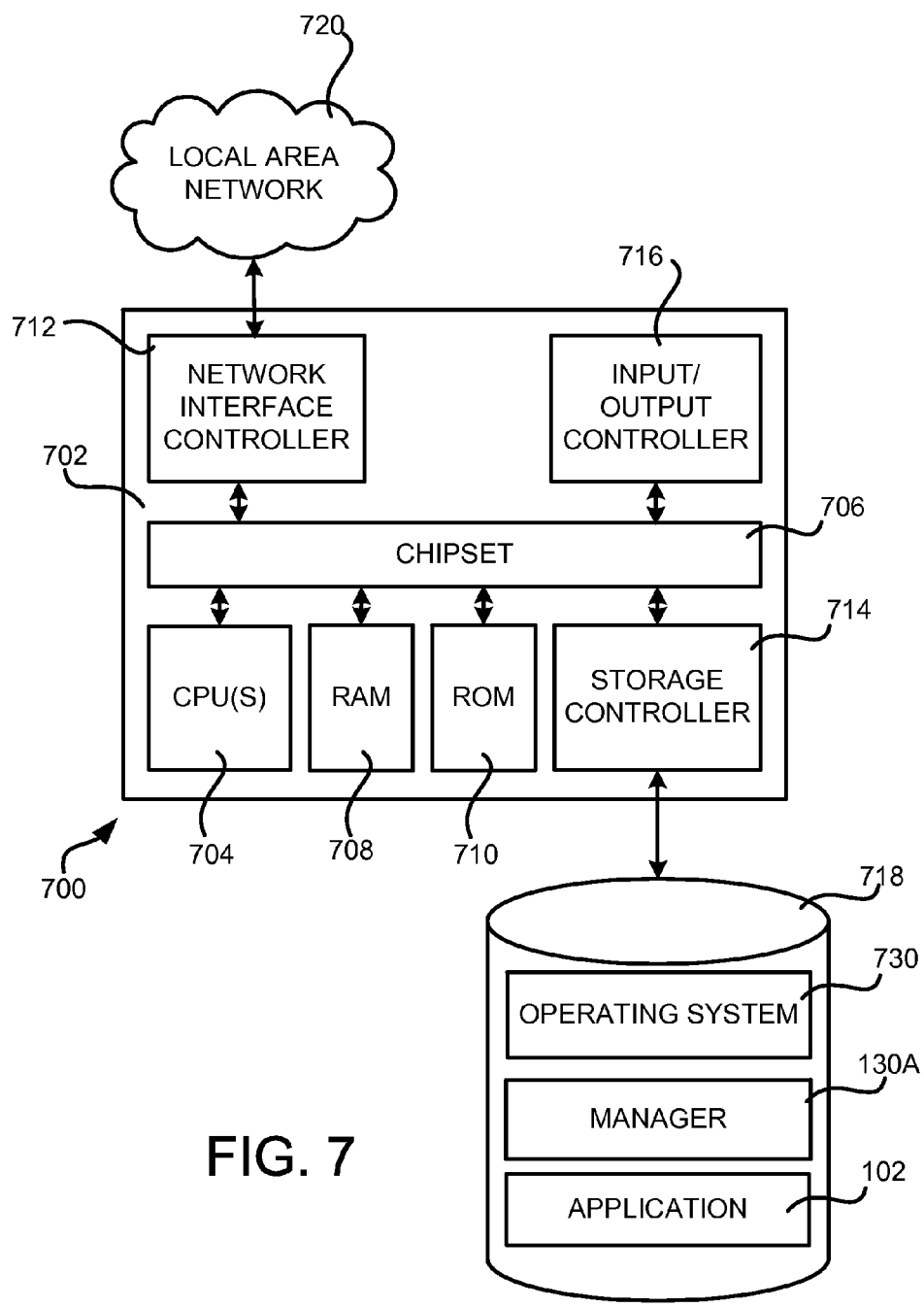
FIG. 7 is a computer architecture diagram showing one illustrative computer hardware architecture for implementing a computing device that might be utilized to implement aspects of the various examples presented herein.

FIG. 7 shows an example computer architecture for a computer 700 capable of executing program components for changing an application between a single-user session and a multi-user session in the manner described above. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 7 may be utilized to execute software components for performing operations as described above. The computer architecture shown in FIG. 7 might also be utilized to implement a computing device 102, a computing device utilized in the application service 104 or the multi-user service 106 or any other of the computing systems described herein.

The computer 700 includes a baseboard 702, or "motherboard," which is a printed circuit board to which a multitude of components or devices may be connected by way of a system bus or other electrical communication paths. In one illustrative example, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by changing from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the examples described herein.

The computer 700 may operate in a networked environment using logical connections to remote computing devices and computer systems through a network, such as the local area network 720. The chipset 706 may include functionality for providing network connectivity through a network interface controller ("NIC") 712, such as a gigabit Ethernet adapter. The NIC 712 is capable of connecting the computer 700 to other computing devices over the local area network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one example, the operating system comprises the LINUX operating system. According to another example, the operating system comprises the WINDOWS® SERVER operating system from MICROSOFT Corporation. According to further examples, the operating system may comprise the UNIX operating system or the ANDROID operating system. It should be appreciated that other operating systems may also be utilized. The mass storage device 718 may store other system or application programs and data utilized by the computer 700, such as components that include the manager 130, the application 110 and/or any of the other software components and data described above. The mass storage device 718 might also store other programs and data not specifically identified herein.

In one example, the mass storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 change between states, as described above. According to one example, the computer 700 has access to computer-readable storage media storing computer-executable instructions which, when executed by the computer 700, perform the various routines described above with regard to FIGS. 3-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for changing an application between a single-user session and a multi-user session have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to change execution of an application from a single-user session to a multi-user session in response to detecting a presence of another computer in a vicinity, the method comprising:

launch a first instance of the application on a first mobile computer in a single-user session in accordance with first profile data related to the first mobile computer;

receive first data, via an application programming interface (API), the first data indicating that a second mobile computer is within the vicinity of the first mobile computer and indicating to add the second mobile computer to the multi-user session;

receive, from a multi-user service, second profile data related to the second mobile computer;

change the execution of the first instance of the application from the single-user session to the multi-user session to take into account preferences identified by the second profile data;

generate a multi-user view for display based, at least in part, on the second profile data and the first profile data;

display the multi-user view on a display of the first mobile computer; and at least one of send the multi-user view to the second mobile computer, or send the multi-user view to a non-mobile display device.

2. The non-transitory computer-readable storage medium of claim 1, having further computer-executable instructions stored thereupon which, when executed by the computer, cause the computer to also receive the first data from a network-based multi-user service.

3. The non-transitory computer-readable storage medium of claim 1, having further computer-executable instructions stored thereupon which, when executed by the computer, cause the computer to also receive the first data from a second instance of the application executing on the second mobile computer.

4. The non-transitory computer-readable storage medium of claim 1, having further computer-executable instructions stored thereupon which, when executed by the computer, cause the computer to utilize functionality of the API to send data to the multi-user service, receive data from the multi-user service, send data to an instance of the application, receive data from an instance of the application, and modify a display of content associated with one or more of the first user or the second user.

5. The non-transitory computer-readable storage medium of claim 1, having further computer-executable instructions stored thereupon which, when executed by the computer, cause the computer to access the multi-user service via a service provider network.

6. A method, comprising:

launching, on a first mobile computer, a first instance of an application in a single-user session;

receiving, at the first mobile computer, first data instructing the first instance of the application to enter a multi-user session, wherein the first data indicates that a second instance of the application is executing on a second mobile computer in a vicinity of the first mobile computer executing the first instance of the application;

causing the first instance of the application to enter the multi-user session that includes the first mobile computer and the second mobile computer;

receiving, at the first mobile computer, second data that identifies a data associated with the second mobile computer, the data associated with the second mobile computer being utilized by the first instance of the application in the multi-user session;

generating a multi-user view display output based, at least in part, on output from the first instance of the application using the data associated with the first mobile computer and the data associated with the second mobile computer; and providing the multi-user display output to a display of the first mobile computer and to the second mobile computer.

7. The method of claim 6, further comprising changing the multi-user session to the single-user session in response to one or more of the second mobile computer leaving the vicinity of the first mobile computer executing the first instance of the application, or the second instance of the application stopping execution.

8. The method of claim 6, wherein the first data is received from a network-based multi-user service that is separate from the first mobile computer and the second mobile computer.

9. The method of claim 6, wherein receiving the second data comprises receiving profile data from a multi-user service, the profile data being generated based, at least in part, on data collected by the multi-user service.

10. The method of claim 6, wherein the first instance of the application utilizes an application programming interface (API) to send and receive data relating to the multi-user session.

11. The method of claim 10, further comprising utilizing the API to change at least a portion of a view displayed on a display associated with a second mobile computer in response to entering the multi-user session.

12. The method of claim 6, wherein receiving the first data occurs in response to detection of the second instance of the application executing on the second mobile computer and wherein the second data is requested from the second mobile computer in response to entering the multi-user session.

13. The method of claim 6, further comprising receiving, from a network-based multi-user service, third data that identifies a preference associated with the second mobile computer based, at least in part, on data maintained by the network-based multi-user service.

14. A system, comprising:

one or more computing devices including one or more processors configured to provide a multi-user service, the one or more processors configured to, receive, from a first mobile computer, first data indicating execution of a first instance of an application by the first mobile computer;

receive, from a second mobile computer, second data indicating execution of a second instance of the application by the second mobile computer in a vicinity of the first mobile computer:

send, to the first mobile computer, third data instructing the first instance of the application to enter a multi-user session that includes the first mobile computer and the second mobile computer;

send, to the first mobile computer, fourth data associated with the second mobile computer and the application;

receive, from the first mobile computer, fifth data output by the first instance of the application providing the multi-user session, the fifth data output generated at least in part on the fourth data, the fifth data output providing a multi-user view; and send the multi-user view to one or more of the first mobile computer, the second mobile computer, or a non-mobile display device, for display.

15. The system of claim 14, wherein send, to the first mobile computer, the third data instructing the application to change to the multi-user session occurs in response to a determination that the second mobile computer is authorized to participate in the multi-user session with the first mobile computer.

16. The system of claim 15, wherein the change to the multi-user session occurs in response to a determination that the second mobile computer is located within the vicinity as the first mobile computer.

17. The system of claim 15, wherein the one or more processors are further configured to access the multi-user service via a service provider network.

18. The system of claim 14, wherein send, to the first mobile computer, the fourth data comprises to send profile data associated with the second mobile device.

19. The system of claim 14, wherein the first instance of the application and the second instance of the application communicate with a network-based multi-user service using an application programming interface (API), wherein the API includes functionality for determining one or more of what type of mobile computer is being used, a first location of the first mobile computer, or a second location of the second mobile computer.

20. The system of claim 14, wherein the one or more processors are further configured to send, to the first mobile computer, an instruction to change the first instance of the application from the multi-user session to a single-user session in response to detecting that the second mobile computer is no longer in the vicinity of the first mobile computer.

* * * * *